United States Patent
Costin et al.

(10) Patent No.: US 8,856,538 B2
(45) Date of Patent: Oct. 7, 2014

(54) SECURED FLASH PROGRAMMING OF SECONDARY PROCESSOR

(75) Inventors: Mark H. Costin, Bloomfield Township, MI (US); Ansaf I. Alrabady, Livonia, MI (US); Kevin M. Baltes, Wixom, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 3 days.

(21) Appl. No.: 13/560,207

(22) Filed: Jul. 27, 2012

(65) Prior Publication Data

US 2014/0032916 A1 Jan. 30, 2014

(51) Int. Cl.
*H04L 9/32* (2006.01)

(52) U.S. Cl.
USPC ........... 713/176; 713/150; 713/168; 380/149; 380/150; 709/226; 709/229

(58) Field of Classification Search
None
See application file for complete search history.

(56) References Cited

U.S. PATENT DOCUMENTS

| 5,859,911 A * | 1/1999 | Angelo et al. ................ 713/187 |
| 2007/0067634 A1* | 3/2007 | Siegler .......................... 713/171 |
| 2009/0193261 A1* | 7/2009 | Yang et al. .................... 713/181 |
| 2010/0023650 A1* | 1/2010 | Prevost et al. .................. 710/16 |
| 2010/0023777 A1* | 1/2010 | Prevost et al. ................ 713/180 |
| 2012/0131322 A1* | 5/2012 | Smith et al. ....................... 713/2 |

* cited by examiner

*Primary Examiner* — Philip Chea
*Assistant Examiner* — Khoi Le
(74) *Attorney, Agent, or Firm* — John A. Miller; Miller IP Group, PLC

(57) ABSTRACT

A system and method for securely flashing a controller, where the controller includes at least one main processor and at least one secondary processor, and where the processing duties are distributed between the processors. A programming tool provides a content file to be flashed and a digital signature to the controller. The controller calculates a hash value of the content file, decrypts the digital signature using a public key to generate a decrypted hash value, compares the decrypted hash value to the calculated hash value, and determines that the content file is valid if the decrypted hash code matches the calculated hash value, where one or more of the steps of calculating the hash value, decrypting the digital signature, comparing the decrypted hash value to the calculated hash value and determining that the content file is valid, is performed by the main processor for the secondary processor.

19 Claims, 4 Drawing Sheets

SECURED FLASH PROGRAMMING OF SECONDARY PROCESSOR

BACKGROUND OF THE INVENTION

1. Field of the Invention

This invention relates generally to a system and method for authenticating files that are programmed into embedded controller and, more particularly, to a system and method for using asymmetric key digital signatures to authenticate the source and content of binary files that are programmed into a secondary processor in a vehicle electronic control unit (ECU), where the method divides the processing between a main processor and the secondary processor in the ECU to meet the computation resources and security needs.

2. Discussion of the Related Art

Most modern vehicles include electronic control units (ECUs), or controllers, that control the operation of vehicle systems, such as the powertrain, climate control system, infotainment system, body systems, chassis systems, and others. Such controllers require special purpose-designed software in order to perform the control functions. With the increasing number and complexity of these controllers, and the growing threat posed by developers of malicious software, it is more important than ever to authenticate the source and content of binary files that are loaded into automotive controllers. The consequences of using software that is not properly authorized, or worse, maliciously-designed, in a vehicle controller include unintended behavior of the vehicle or its systems, loss of anti-theft features on the vehicle, potential tampering with components such as the odometer, and loss of other vehicle features and functions.

One know digital coding technique is referred to as asymmetric key cryptography that uses digital signatures for authenticating files that are programmed into controllers. As would be well understood by those skilled in the art, asymmetric key cryptography uses a pair of mathematically-related keys, known as a private key and a public key, to encrypt and decrypt a message or file. To create a digital signature, a signer uses his private key, which is known only to himself, to encrypt a message. The digital signature can later be decrypted by another party using the public key, which is paired to the signer's private key.

Flashing is a well known process for uploading software, calibration files and other applications into the memory of a vehicle ECU or other programmable device. A bootloader is an embedded software program loaded on the ECU that provides an interface between the ECU and a programming tool or device that uploads the software. The bootloader typically employs asymmetric key cryptography and stores a public key that must be used to decode the digital signature transferred by the programming tool before allowing the ECU to execute the software.

Many ECUs include more than one processor, where one of the processors may be a main processor having significant computing power (message bit size, RAM size, etc.) and other processors may be secondary processors having limited computing power. A typical modern vehicle may include dozens of ECUs of varying complexity and possibly including various combinations of main processors, including redundant main processors, and secondary processors. When the programming tool is used to reprogram or reflash the processors within the ECU, the programming tool will interact with the main processor and instructions within the signals provided by the programming tool will tell the main processor whether the reflashing is for a particular secondary processor within the ECU.

For the asymmetric digital key coding discussed above, secure programming requires a signature scheme that consists of an encryption part and a message digest or hash part. The encryption part verifies the source authenticity and the hash part verifies the content integrity. These operations require significant computing power. For many secondary processors employed in existing vehicle ECU, it is generally difficult to perform the secure flashing discussed above because these processors are often small 8-bit controllers and do not have the memory space for buffering data for large algorithms. In other words, since the encryption and hash algorithms can take up valuable memory space within the secondary controller, these types of controllers may not be able to perform the necessary secure flashing. Therefore, when programming the less powerful secondary processors in an ECU, there are limits as to how secure that programming can be performed.

SUMMARY OF THE INVENTION

In accordance with the teachings of the present invention, a system and method are disclosed for securely flashing a controller, where the controller includes at least one main processor and at least one secondary processor, and where the processing duties for securely performing the flash are distributed between the processors. A programming tool provides a content file to be flashed and a digital signature to the controller. The controller calculates a hash value of the content file, decrypts the digital signature using a public key to generate a decrypted hash value, compares the decrypted hash value to the calculated hash value, and determines that the content file is valid if the decrypted hash value matches the calculated hash value, where one or more of the steps of calculating the hash value, decrypting the digital signature, comparing the decrypted hash value to the calculated hash value and determining that the content file is valid is performed by the main processor for the secondary processor.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for distributing processing duties between a main processor and a secondary processor in an ECU when securely programming the secondary processor is merely exemplary in nature, and is in no way intended to limit the invention or its applications or uses. For example, the discussion herein is specific to a vehicle ECU. However, as will be appreciated by those skilled in the art, the technique of the present invention may have application for flashing other processors other than vehicle processors.

Figure 1:
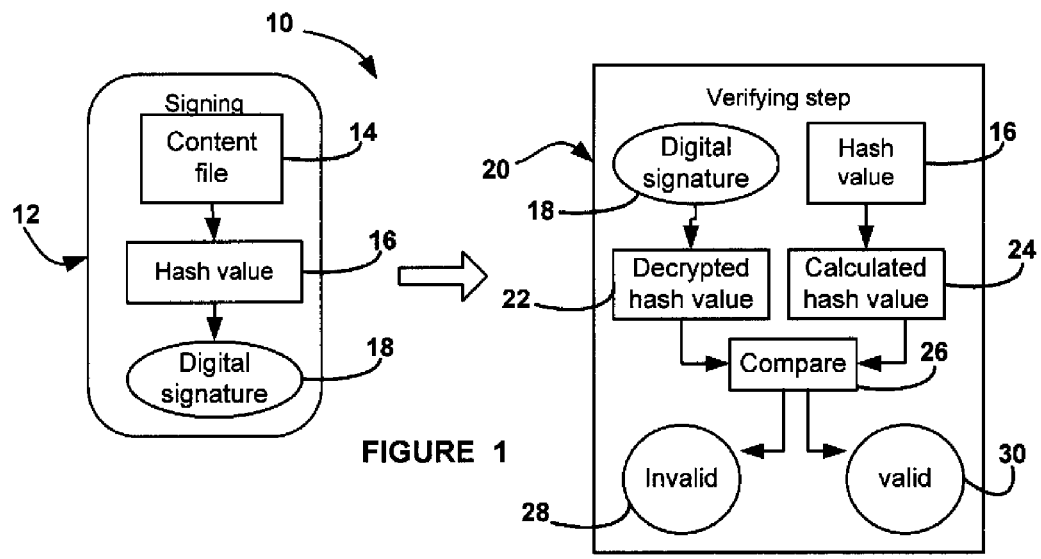
FIG. 1 is a block diagram showing a standard method for signing and verifying an electronic file using a digital signature.

FIG. 1 is a block diagram 10 of a known method for using asymmetric key cryptography—specifically, digital signatures—for authenticating files, code and other software that are programmed into controllers. As would be well understood by those skilled in the art, asymmetric key cryptography uses a pair of mathematically-related keys known as a private key and a public key to encrypt and decrypt a message. To create a digital signature, a signer uses his private key, which is known only to himself, to encrypt a digital string. The digital signature can later be decrypted by another party using the public key which is paired to the signer's private key.

In a signing step 12, a content file 14 is provided, where the content file 14 could be a piece of software, a calibration file, or other "soft-part" content to be used in a controller. A hash calculation is performed on the content file 14 to produce a hash value 16. The hash value 16 is then encrypted with the signer's private key to produce a digital signature 18.

The digital signature 18 and the content file 14 are then used in a verifying step 20. The digital signature 18 is decrypted using the signer's public key to produce a decrypted hash value 22. Meanwhile, a hash calculation is performed on the content file 14 by the verifier to produce a calculated hash value 24. At box 26, the decrypted hash value 22 is compared to the calculated hash value 24. If the decrypted hash value 22 matches the calculated hash value 24, then a valid determination at oval 30 is issued, and the content file 14 is used. If the decrypted hash value 22 does not match the calculated hash value 24, then an invalid determination at oval 28 is issued, and the content file 14 is not used.

Figure 2:
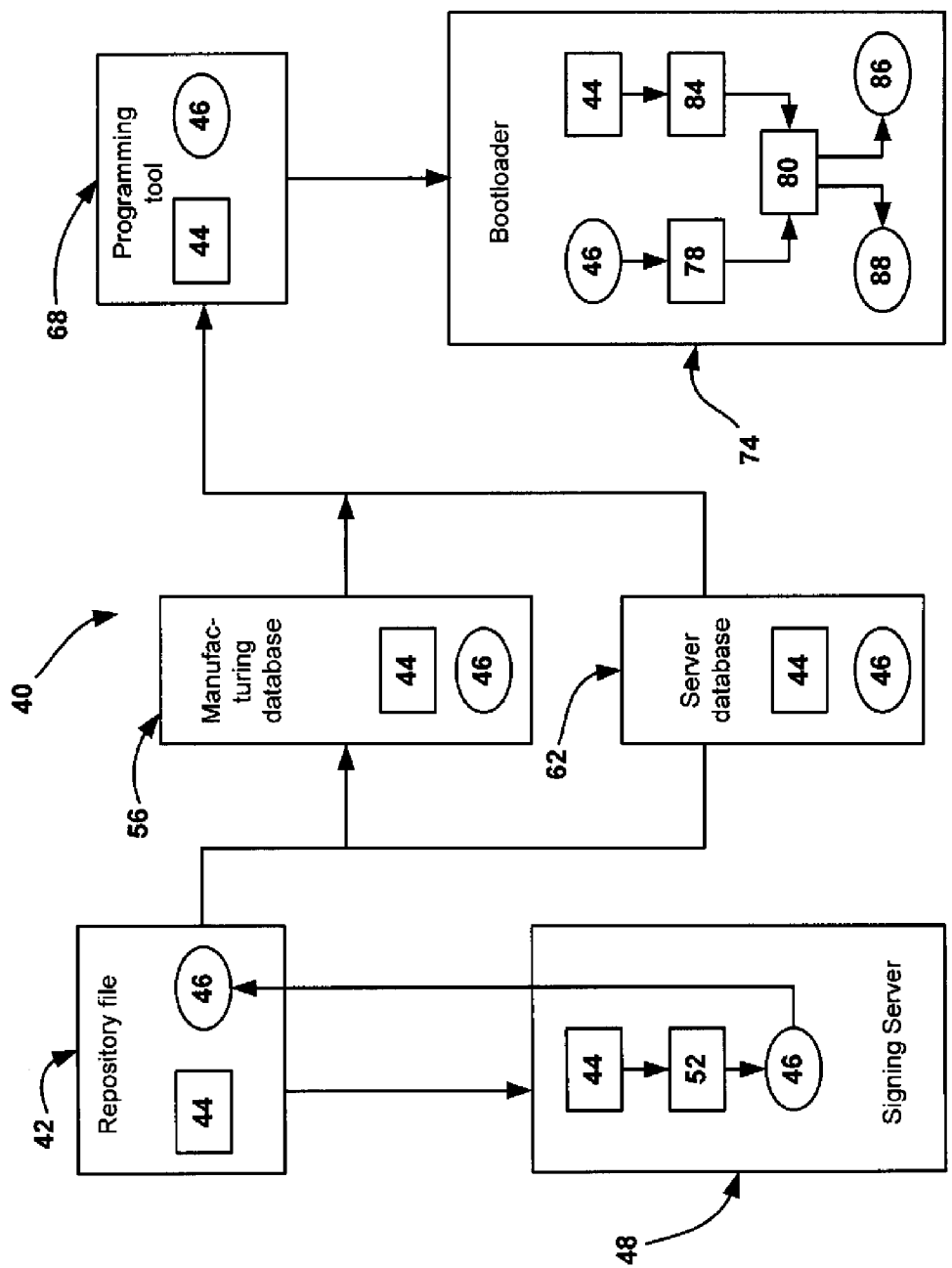
FIG. 2 is a block diagram of a method for signing and verifying an electronic content file using a digital signature including the delivery of content and signature files from a programming source to an executing controller.

FIG. 2 is a block diagram 40 showing a method for signing and verifying electronic content using a digital signature, including the delivery of content and signature files from a programming source to an executing controller. A file repository 42 stores a software executable and/or a calibration file, collectively known as a content file 44, where the content file 44 is typically a binary file. It is desired to obtain a digital signature 46 for the content file 44. In order for the content file 44 to be digitally signed, the content file 44 is provided to a signing server 48. On the signing server 48, a hash calculation is performed on the content file 44 to produce a hash value 52. The hash value 52 is encrypted using the private key of the signing server 48, where the encryption produces the digital signature 46. The digital signature 46 is then provided back to the repository 42.

At this point, the content file 44 and the digital signature 46 both exist in the repository 42. The challenge is then to deliver the content file 44 and the digital signature 46 through the various business systems used by the automotive manufacturer and install and validate the content file 44 on a controller in a vehicle. In general, an automotive manufacturer will have at least two organizations or departments responsible for installing software and calibration files on controllers in vehicles, namely, manufacturing and service. FIG. 2 shows a manufacturing database 56 used by the automotive manufacturer's manufacturing department for managing electronic files which are installed as "parts" in production vehicles. FIG. 2 likewise shows a service database 62 used by the auto manufacturer's service department for managing electronic files which are installed as "service parts" in vehicles that are worked on in a service facility. As shown in FIG. 2, the manufacturing database 56 and the service database 62 both receive copies of the content file 44 and the digital signature 46 to be used for the respective functions of the manufacturing and service departments.

In order to actually install the content file 44 on a controller in a vehicle, a programming tool 68 is used. As shown, the programming tool 68 also receives a copy of the content file 44 and the digital signature 46. That is, the manufacturing department could provide the content file 44 and the digital signature 46 from the manufacturing database 56 to the programming tool 68 for installation on a new production vehicle, or the service department could provide the content file 44 and the digital signature 46 from the service database 62 to the programming tool 68 for installation on a vehicle being serviced.

The next step is for the programming tool 68 to install the content file 44 on a controller in a vehicle. In this example, an ECU 74 is the controller that will actually use the content file 44. Following is a brief discussion of the architecture of the ECU 74. The software on the ECU 74 consists of a bootloader, a software executable, and one or more calibration files. For the purposes of this discussion, the ECU 74 is assumed to have a single central processing unit (CPU). In actual vehicles, the ECU 74 could have multiple CPUs, discussed below as primary processors and secondary processors, and each CPU would have a bootloader, a software executable, and one or more calibration files.

The bootloader in the ECU 74 is responsible for validating and installing new software executables and calibration files. Thus, the functions described in this paragraph are performed by the bootloader in the ECU 74. The programming tool 68 provides the content file 44 and the digital signature 46 to the ECU 74. The digital signature 46 is decrypted by the bootloader using an embedded public key to produce a decrypted hash value 78. Meanwhile, a hash calculation is performed on the content file 44 by the bootloader to produce a calculated hash value 84. At box 80, the decrypted hash value 78 is compared to the calculated hash value 84. If the decrypted hash value 78 matches the calculated hash value 84, then a valid determination is issued at oval 86, where the bootloader marks the content as valid indicating the match, and the content file 44 is used. If the content file 44 is a software executable, the ECU 74 uses it as a new software executable. If the content file 44 is a calibration file, the ECU 74 uses it as one of the one or more calibration files. If the decrypted hash value 78 does not match the calculated hash value 84, then an invalid determination is issued at oval 88, and the content file 44 is not used on the ECU 74.

Figure 3:
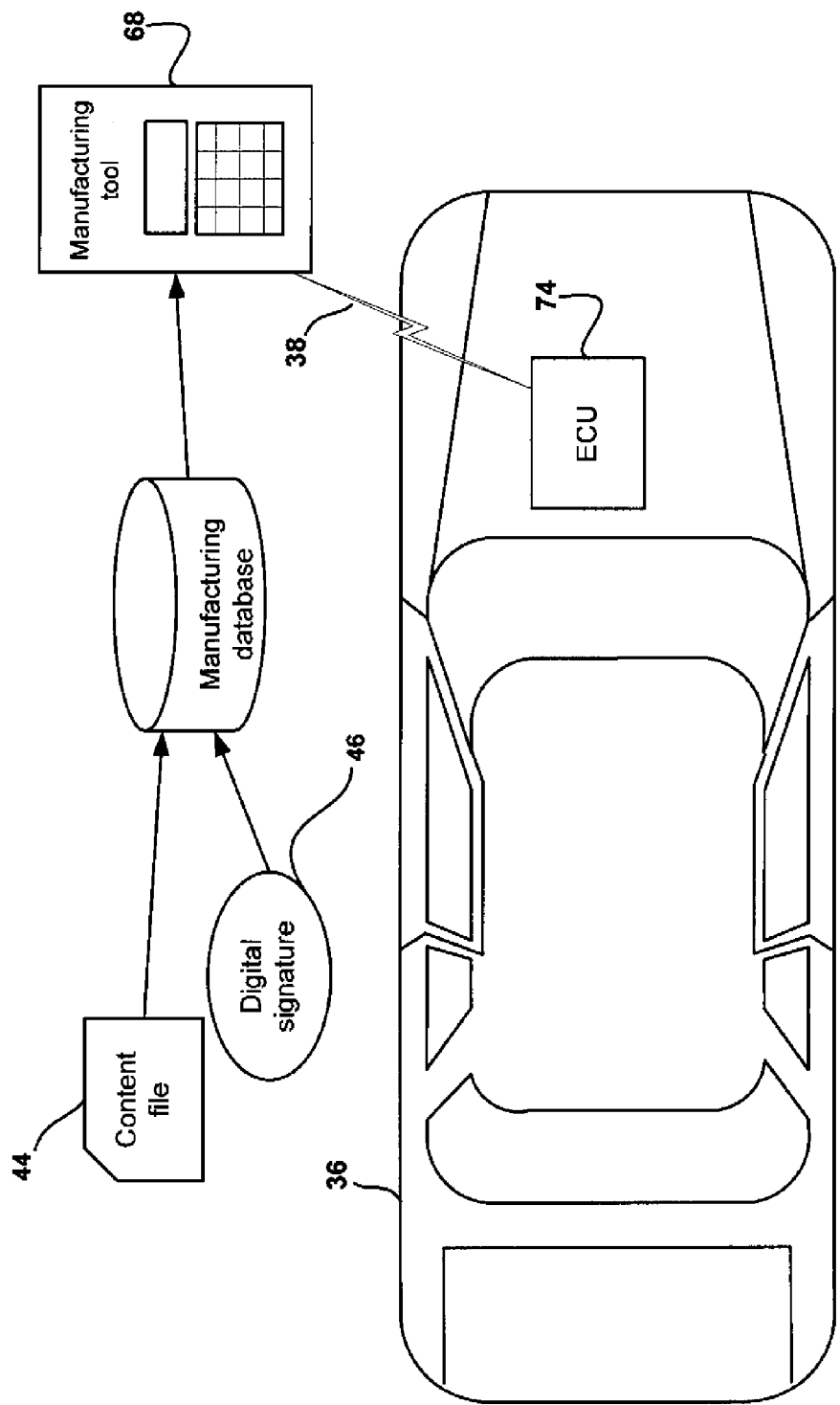
FIG. 3 is a schematic diagram showing how electronic content and a digital signature are physically delivered to a controller in a vehicle.

FIG. 3 is a schematic diagram showing how electronic content and digital signature files are physically delivered to a vehicle controller. A vehicle 36 includes the ECU 74 shown in FIG. 2 and discussed above. The ECU 74 could control the engine, transmission, chassis, body, infotainment, or other system on the vehicle 36. The content file 44 and the digital signature 46 are provided to a central database, shown here as the manufacturing database 56. The transfer of the content file 44 and the digital signature 46 to the manufacturing database 56 could take place over a company network. The manufacturing database 56 provides the content file 44 and the digital signature 46 to the programming tool 68, where this transfer could be accomplished by attaching the programming tool 68 to a computer which has access to the database 56. The programming tool 68 communicates with the ECU 74 via a connection 38, which may be wired or wireless. With the connection 38 established, the content file 44 and the digital signature 46 can be downloaded from the programming tool 68 to the ECU 74, where the bootloader can perform the security verification functions discussed previously.

As will be discussed in detail below, the present invention proposes a process for securely programming or flashing CPUs or processors in an ECU, and specifically a vehicle ECU. The programming process uses asymmetric key cryptography employing a digital signature, a private key and a public key as discussed above. As mentioned, some secondary processors in vehicle ECUs may not have the computing power and memory capacity to perform all of the decryption, hashing, validation, etc. discussed above for asymmetric key cryptography. Thus, the present invention proposes distributing the processing duties between a main processor and a secondary processor in the ECU to provide the secure flashing for the secondary processor, including having the main processor perform all of the processing steps needed to validate the software or content file being flashed and then storing that software on the secondary processor.

By allowing the main processor to do some or all of the decryption for security purposes, then it is possible to still use small inexpensive secondary processor in the vehicle ECU and be able to program those processors securely. The determination of how much the main processor will perform the validation, decryption and hashing for the secondary processor depends on the size of the buffers in the main processor and the secondary processors and the computing power and memory capabilities of the CPUs in those processors.

Figure 4:
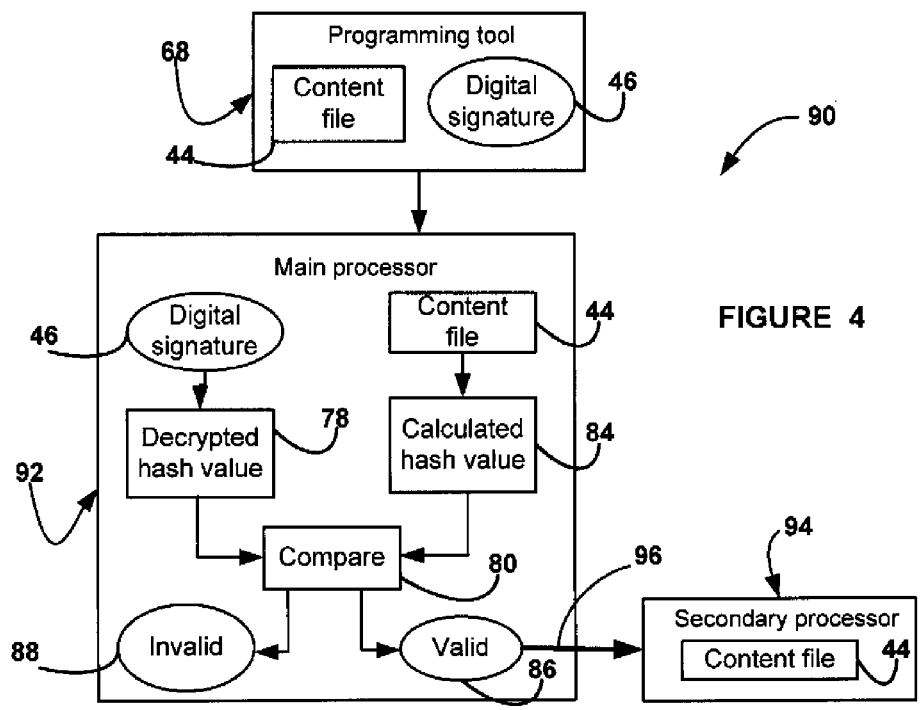
FIG. 4 is a block diagram of a first scheme for flashing a secondary processor on an ECU with the help of a main processor.

FIG. 4 is a block diagram 90 showing a programming or flashing process that uses a main processor 92 for operating the secure processing algorithms so that a secondary processor 94 in the ECU 74 that has low computer power and memory capacity can be securely flashed using the asymmetric key cryptography. As above, the main processor 92 receives the content file 14 and the signature 46 from the programming tool 68. The discussion above referred to the process of validating the content file 14 to be flashed as being performed generally on the ECU. In this more detailed version, the actual decryption and hashing steps discussed above are performed by a processor within the ECU, here the main processor 92. Thus, the process discussed above for verifying the content file 44 and the digital signature 46 is the same as performed in the main processor 92 in the diagram 90. Once the main processor 92 has validated the content file 44 at the oval 86 as being secure, it is then downloaded to be stored in the memory of the secondary processor 94 shown by line 96. Thus, the secondary processor 94 does not perform any of the validation and hashing functions for decrypting the content file 44, but merely receives the content file 44 from the main processor 92 once it has been validated. While the main processor 92 is performing the hash calculations and the signal verification process discussed herein, the content file 14 being verified is stored in the RAM or buffer of the main processor 92.

Figure 5:
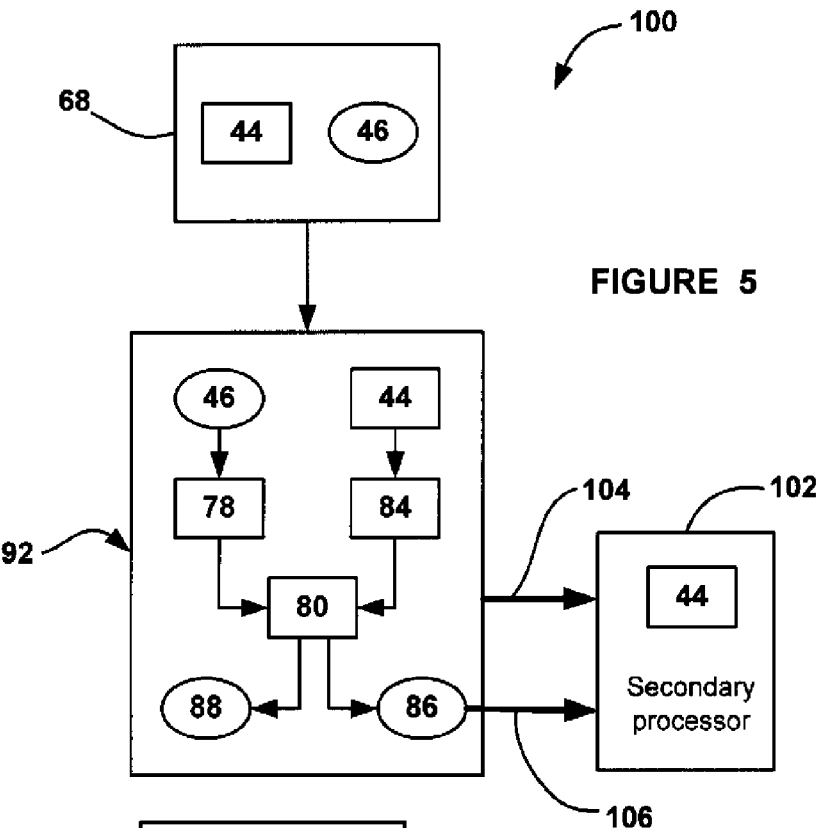
FIG. 5 is a block diagram of a second technique for flashing a secondary processor on an ECU with the help of a main processor.

FIG. 5 is a block diagram 100 showing an alternative programming process for securely flashing a secondary processor 102 on the ECU having a slight variation to the process shown by the block diagram 90. In the block diagram 90, the content file 44 that is to be flashed into the secondary processor 94 was stored in the RAM of the main processor 92 while it was being validated, and once it is validated it is then transferred to the secondary processor 94. In the alternative shown by the block diagram 100, the content file 44 is stored in the main memory, not a RAM buffer, of the secondary processor 102 shown by line 104 while the main processor 92 is validating the content file 44. Thus, the main processor does not need to use buffer space for the content file while it is validating it and can use that space for the decryption calculations. Once the main processor 92 calculates the hash of the content file 44 stored in the secondary processor 102 and compares it to the decrypted hash value, the main processor 92 will then indicate that the content file 44 already stored in the secondary processor 102 is valid to be used on line 106. If the main processor 92 indicates that the hash verification process failed on the line 106, the secondary processor 102 can erase the newly flashed content file 44. Because the secondary processor 102 does not have the processing power, i.e., RAM size, to buffer the code, it is flashed into its memory before validation, as discussed.

Figure 6:
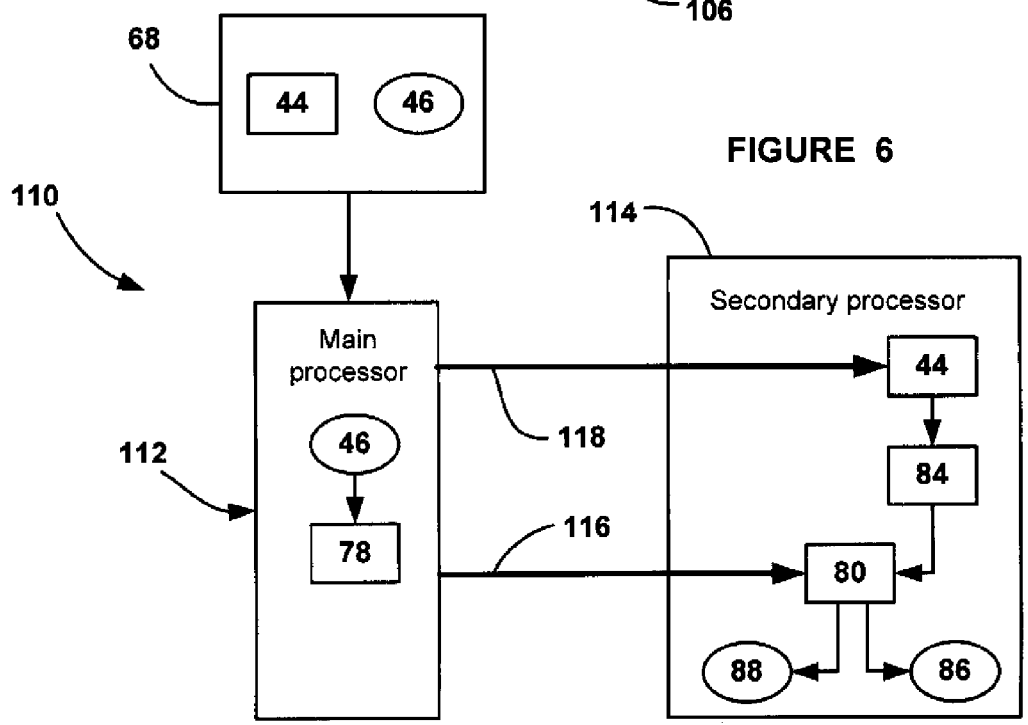
FIG. 6 is a block diagram of a third technique for flashing a secondary processor on an ECU with the help of a main processor.

FIG. 6 is a block diagram 110 showing a process for securely flashing a secondary processor 114 with help from a main processor 112 in an ECU. In this embodiment, the main processor 112 receives the signature 46 and the content file 44 from the programming tool 68 and then decrypts the signature 46 using the signer's public key to generate the decrypted hash value 78 and sends the decrypted hash value 78 to the secondary processor 114 on line 116. The remaining decryption and validation processes are performed by the secondary processor 114. Particularly, the main processor 112 sends the content file 14 to the secondary processor 114 on line 118 and the secondary processor 114 calculates the hash value 84. The decrypted hash value 78 and the calculated hash value 84 are then compared at the box 80 in the secondary processor 114 and the secondary processor 114 determines whether the content file 14 is valid or invalid. As above, if the decrypted hash value 78 and the calculated hash value 84 match, the secondary processor 114 writes a presence pattern indicating the match and exits the boot, and if it is invalid, erases the newly flashed code and stays in the boot mode.

As will be well understood by those skilled in the art, the several and various steps and processes discussed herein to describe the invention may be referring to operations performed by a computer, a processor or other electronic calculating device that manipulates and/or transforms data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for securely flashing a controller, said controller including at least one main processor and at least one secondary processor where the main processor includes greater computing power than the secondary processor, said method comprising:

providing a content file to be flashed and a digital signature to the controller;

calculating a hash value of the content file in the controller;

decrypting the digital signature to generate a decrypted hash value in the controller;

comparing the decrypted hash value to the calculated hash value;

determining that the content file is valid if the decrypted hash value matches the calculated hash value; and storing the content file in the at least one secondary processor, wherein one or more of calculating a hash value of the content file, decrypting the digital signature using a public key to generate a decrypted hash value, comparing the decrypted hash value to the calculated hash value and determining that the content file is valid if the decrypted hash value matches the calculated hash value are performed by the main processor, and wherein the secondary processor uses the content file if the main processor determines that the content file is valid and erases the content file if the main processor determines that the content file is invalid.

2. The method according to claim 1 wherein all of calculating a hash value of the content file, decrypting the digital signature using a public key to generate a decrypted hash value, comparing the decrypted hash value to the calculated hash value, and determining that the content file is valid if the decrypted hash value matches the calculated hash value are performed by the main processor.

3. The method according to claim 2 wherein storing the content file in the secondary processor is performed after the main processor determines that the content file is valid.

4. The method according to claim 3 wherein the content file is stored in a buffer in the main processor while the main processor calculating a hash value of the content file, decrypting the digital signature using a public key to generate a decrypted hash value, comparing the decrypted hash value to the calculated hash value, and determining that the content file is valid.

5. The method according to claim 1 wherein decrypting the digital signature using a public key to generate a decrypted hash value is performed by the main processor and calculating a hash value of the content file, comparing the decrypted hash value to the calculated hash value and determining that the content file is valid are performed by the secondary processor.

6. The method according to claim 1 wherein the secondary processor has an 8-bit central processing unit (CPU).

7. The method according to claim 1 wherein the controller is an electronic control unit (ECU) on a vehicle.

8. The method according to claim 1 wherein providing a content file and a digital signature includes providing the content file and the digital signature using a programming tool.

9. The method according to claim 1 wherein the digital signature is encrypted using a signer's private key and wherein decrypting the digital signature includes using a public key.

10. The method according to claim 1 wherein the at least one secondary processor is a plurality of secondary processors.

11. A method for securely flashing a secondary processor in a controller, said controller including a main processor having greater computing power than the secondary processor, said method comprising:
providing a content file and a digital signature to the main processor in the main processor;
decrypting the digital signature to generate a decrypted hash value in the main processor;
providing the content file from the main processor to the secondary processor;
calculating a hash value of the content file in the secondary processor;
providing the decrypted hash value from the main processor to the secondary processor;
comparing the decrypted hash value to the calculated hash value in the secondary processor; and
determining that the content file provided from the main processor is valid and can be used in the secondary processor if the decrypted hash value matches the calculated hash value of the secondary processor, otherwise, the content provided from the main processor is invalid and erases from the secondary processor if the decrypted hash value does not match the calculated hash value of the secondary processor.

12. The method according to claim 11 wherein the secondary processor has an 8-bit central processing unit (CPU).

13. The method according to claim 11 wherein the controller is an electronic control unit (ECU) on a vehicle.

14. The method according to claim 11 wherein providing a content file and a digital signature includes providing the content file and the digital signature using a programming tool.

15. The method according to claim 11 wherein the digital signature is encrypted using a signer's private key and wherein decrypting the digital signature includes using a public key.

16. A method for securely flashing a secondary processor in an electronic control unit (ECU) on a vehicle, said ECU also including a main processor having greater computing power than the secondary processor, said method comprising:
providing a content file and a digital signature to the main processor in the main processor;
decrypting the digital signature to generate a decrypted hash value in the main processor;
providing the content file from the main processor to the secondary processor;
calculating a hash value of the content file in the secondary processor;
providing the decrypted hash value from the main processor to the secondary processor;
comparing the decrypted hash value to the calculated hash value in the secondary processor; and
determining that the content file is valid and can be used in the secondary processor if the decrypted hash value matches the calculated hash value, otherwise, the content is invalid and erases from the secondary processor if the decrypted hash value does not match the calculated hash value.

17. The method according to claim 16 wherein providing a content file and a digital signature includes providing the content file and the digital signature using a programming tool.

18. The method according to claim 16 wherein the digital signature is encrypted using a signer's private key and wherein decrypting the digital signature includes using a public key.

19. The method according to claim 16 wherein the secondary processor has an 8-bit central processing unit (CPU).

* * * * *